United States Patent [19]

Scapellati

[11] Patent Number: 5,668,708
[45] Date of Patent: Sep. 16, 1997

[54] DC POWER SUPPLY WITH REDUCED RIPPLE

[75] Inventor: Cliff Scapellati, Sayville, N.Y.

[73] Assignee: Spellman High Voltage Electronics Corp., Hauppage, N.Y.

[21] Appl. No.: 614,997

[22] Filed: Mar. 13, 1996

[51] Int. Cl.$^6$ .................................................. H02M 1/12
[52] U.S. Cl. .................................................. 363/46
[58] Field of Search .......................... 363/45, 46, 48, 363/95

[56] References Cited

U.S. PATENT DOCUMENTS

| | | | |
|---|---|---|---|
| 3,654,489 | 4/1972 | Knapton | 307/252 |
| 3,656,065 | 4/1972 | Reinhard et al. | 330/10 |
| 3,684,968 | 8/1972 | Carroll | 328/142 |
| 3,729,675 | 4/1973 | Vosteen | 324/72 |
| 4,032,843 | 6/1977 | Loucks | 324/96 |
| 4,158,819 | 6/1979 | Smither | 330/9 |
| 4,267,422 | 5/1981 | Bell, Jr. et al. | 219/69 |
| 4,281,299 | 7/1981 | Newbold | 333/187 |
| 4,350,891 | 9/1982 | Wuerflein | 378/110 |
| 4,538,287 | 8/1985 | Roberts et al. | 377/60 |
| 4,630,218 | 12/1986 | Hurley | 364/481 |
| 4,693,805 | 9/1987 | Quazi | 204/192.22 |
| 4,914,312 | 4/1990 | Akama et al. | 307/5 |
| 4,946,239 | 8/1990 | Garmon | 350/96.31 |
| 5,499,392 | 3/1996 | Grunwell | 455/260 |

*Primary Examiner*—Peter S. Wong
*Assistant Examiner*—Rajnikant B. Patel
*Attorney, Agent, or Firm*—Gottlieb, Rackman & Reisman

[57] ABSTRACT

A switching power supply for providing a dc voltage with substantially no ripple includes a rectifier for rectifying an ac supply, a filter for filtering the rectifier output and an inductor for current limiting. The filtered output includes a ripple generated by the equivalent series resistance of the filter. This ripple is sensed and used to generate a correcting signal. The correcting signal is arranged and sized so that when it is superimposed on the filtered output, the ripple is substantially eliminated. Preferably the correcting signal is coupled to the inductor.

17 Claims, 4 Drawing Sheets

DC POWER SUPPLY WITH REDUCED RIPPLE

BACKGROUND OF THE INVENTION

A. Field of the Invention

This invention pertains to dc power supplies, and more particularly to switched dc power supplies having circuitry constructed and arranged to eliminate ripple on the output.

B. Description of the Prior Art

Switched dc power supplies have become popular in a large number of applications as a means of providing an efficient and reliable power source of substantially any desired voltage and power requirements. While in many of these applications, a ripple of relatively large amplitudes can be tolerated, in other applications, the ripple must be minimized. This consideration is important, for example for power sources used in remote locations, or power supplies used to provide power to a remote, and often inaccessible location, where the leads from the power source to the load is use secondarily for a second function, such as, for example, communications. In these applications, the ripple on the output must be reduced so that it will not interfere with the communication channel. However, the inventors have found that it is virtually impossible to eliminate theh ripple completely using standard single or multi-stage filters because of resulting equivalent series resistance (ESR).

Earlier attempts at resolving this problem can be seen, for example, in Technical Support Package entitled, "Reducing Ripple in a Switching Voltage Regulator", NASA Tech Briefs GSC-13594. While this document suggests a current injection scheme for reducing ripple at the output of switching voltage regulator, fails to appreciate the effects of the ESR on ripple, and erroneously states that the effects of ESR are neglibible.

OBJECTIVES AND SUMMARY OF THE INVENTION

In view of the disadvantages of the prior art, it is an objective of the present invention to provide a power supply with an extremely low level ripple on the output.

A further objective is to provide a switched power supply with a ripple eliminating circuit with few and inexpensive components, whereby the cots and time for making the power supply are not unduly increased.

Other objectives and advantages of the invention shall become apparent form the following description. Briefly, a power supply constructed in accordance with this invention includes an output stage with a filter having an inherent equivalent series resistivity. The power supply further includes in its output stage a ripple eliminator. This eliminator includes a means of measuring the ripple current flowing through the filter ESR. A current of substantially equal magnitude but opposite polarity is injected into the power supply output to effectively neutralize the ripple using inductive coupling.

DETAILED DESCRIPTION OF THE INVENTION

Figure 1:
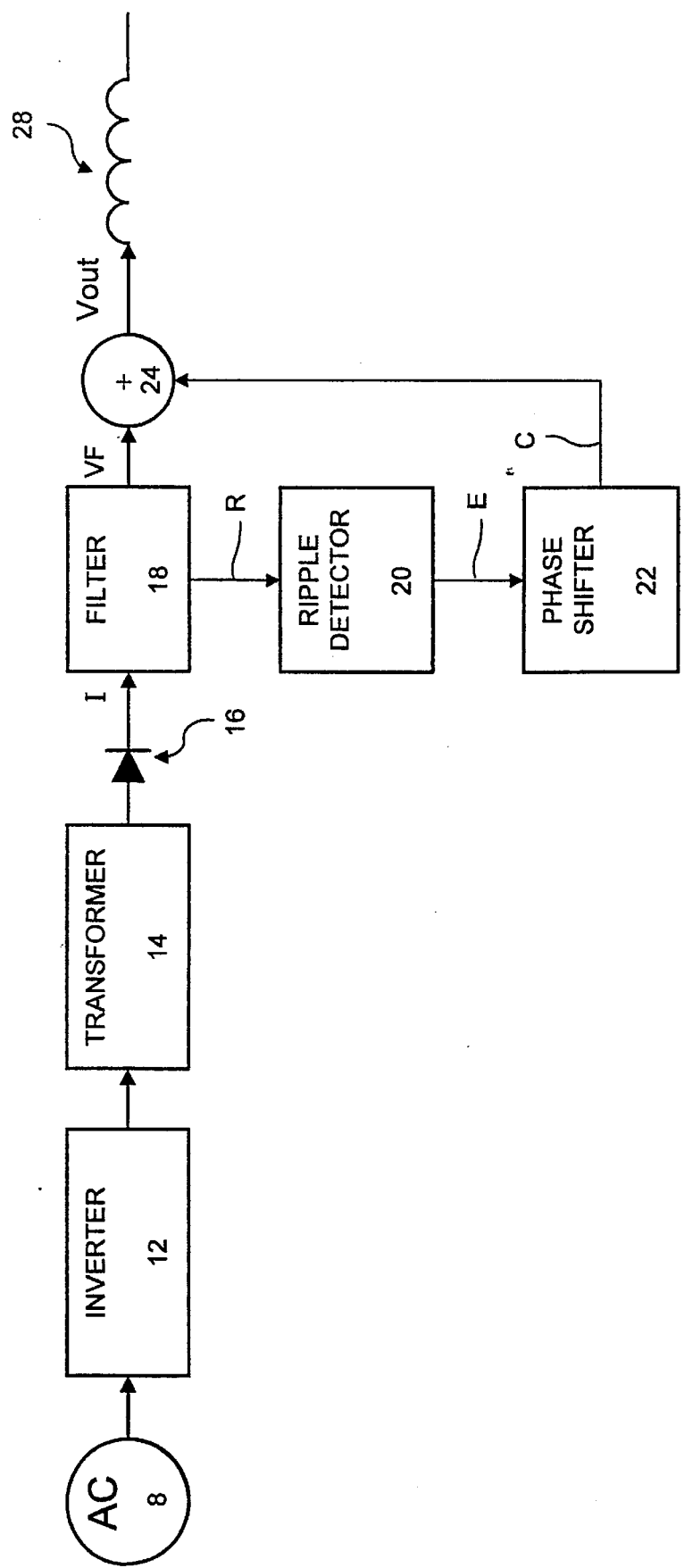
FIG. 1 shows a block diagram of a power supply constructed in accordance with this invention.

Referring now to FIG. 1, a power supply 10 constructed in accordance with this invention includes an inverter 12 receiving power from a standard ac source 14. The inverter converts this signal to a high frequency signal of about 50 KHz. This signal is fed to a transformer 14 which converts it to a voltage signal of a preselected nominal amplitude. The high voltage signal from the transformer is rectified by a rectifier 16, and filtered by a filter 18. Filter 18 produces a signal VF composed of a dc component VDC and a ripple component R. As previously mentioned the filter 18 has an equivalent series resistance or ESR (discussed more fully below) which is responsible ripple component.

Figure 1A:
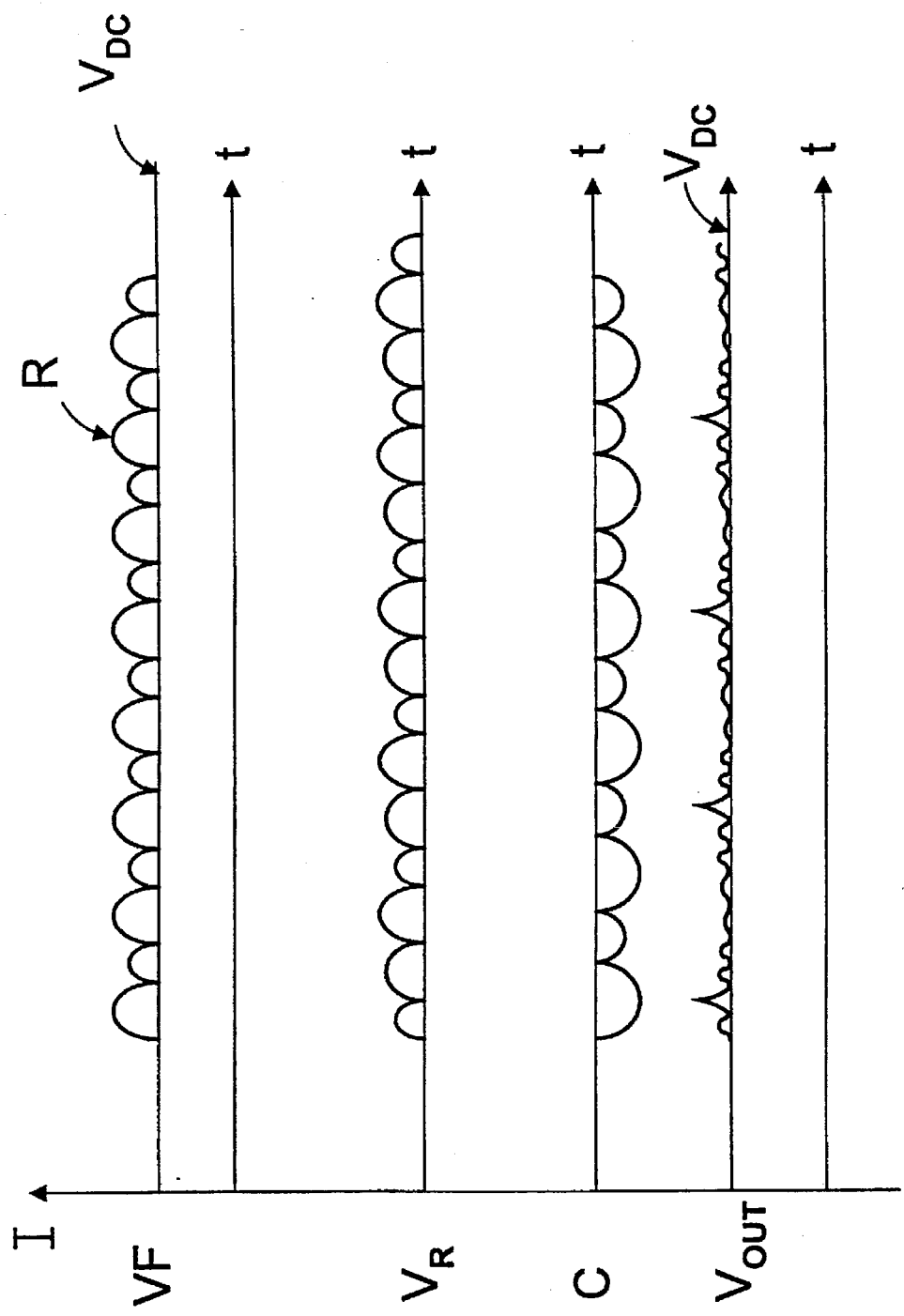
FIG. 1A shows a time dependent graph of various signals generated in the block diagram of FIG. 1.

In accordance with this invention, this ripple R is sensed by a ripple detector 20. The ripple detector generates an error correcting signal E, which is processed by a phase shifter 22 to generate a signal C having peaks occurring at the same time as the peaks of ripple R, and having an opposite phase or polarity therefrom. The output of filter 18 VF and phase shifter 22, C, are fed to a summer 24. In this summer, the ripple R is substantially eliminated in the output Vout as shown in FIG. 1A. Normally a current limiting inductor is provided at the output of the filter 18. This inductor is essentially a current limiting device provided to protect the power supply and the output load device 10 from high fault currents on its output.

Figure 2:
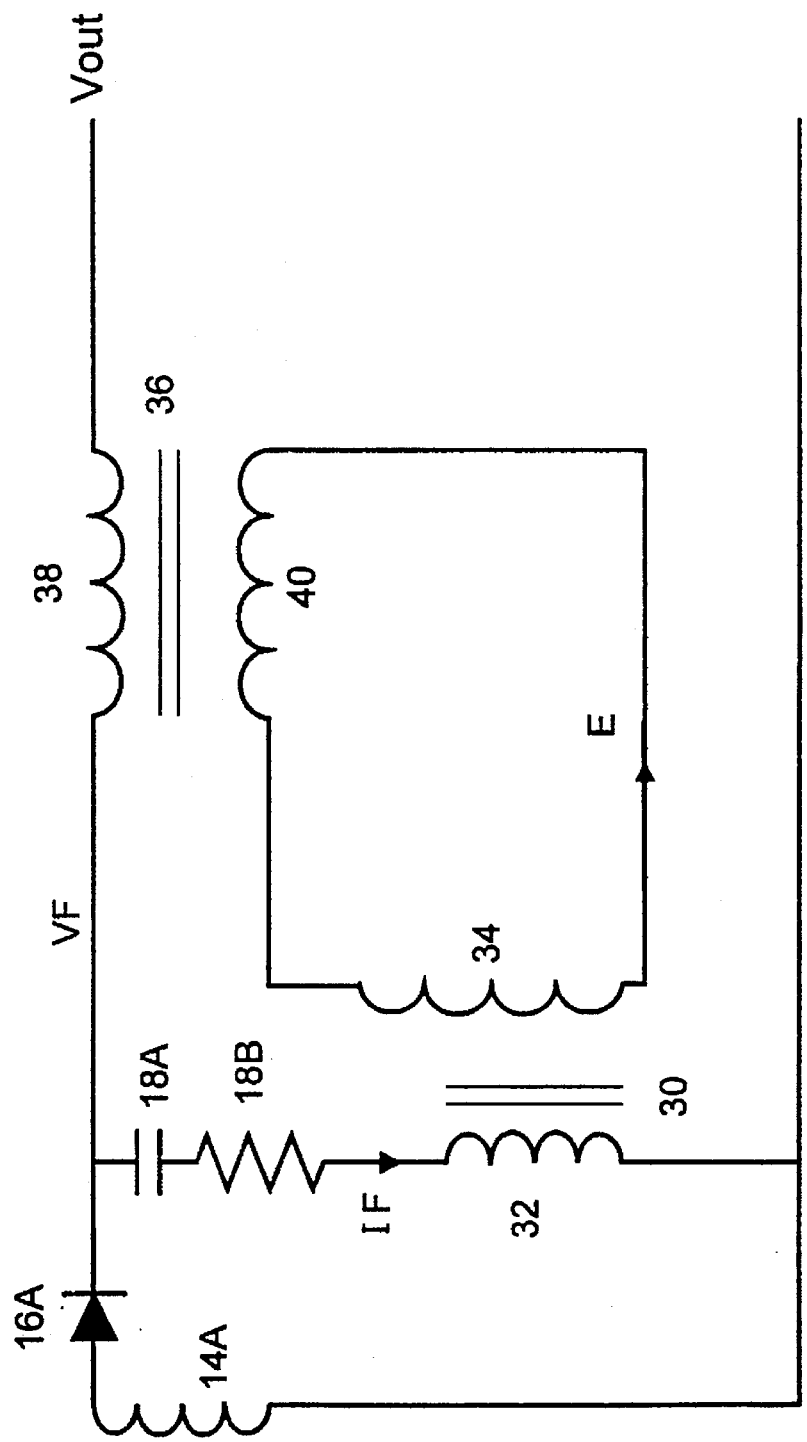
FIG. 2 shows a circuit diagram of a ripple elimination circuit for the power supply of FIG. 1.

A preferred implementation of the invention is shown in FIG. 2. In this Figure, the transformer 14 is represented by a secondary coil 14A (the primary coil being omitted). The rectifier 16 is shown as a diode 16A. Filter 18 may be a multiple stage filter represented by an equivalent capacitor 18A and equivalent series resistor 18B.

As previously mentioned, current If flowing through filter 18 produces the ripple R due to the ESR 18B. In order to eliminate this ripple, a transformer 30 is provided by the present invention having a primary coil 21 in series with the ESR 18B and a secondary coil 34. Preferably this transformer has a coil ratio determined by the amplitute of ripple component due to ESR, and may be typically in the range of 1:10, to 1:20. In addition, inductor 28 is replaced with a second transformer 36. The primary coil 38 of the transformer 36 has the same inductance and serves the same purpose as inductor 28. The secondary coil 40 of transformer 36 is connected in parallel with the secondary coil 34. Importantly the coils 38 and 40 are wound in the opposite direction to provide a 180° phase shift. Preferably the coils of transformer 36 have a ratio in the range of 1:10 to 1:20.

The circuit of FIG. 2 operates as follows. The current through coil 32 induces a voltage in coil 34. This voltage is transmitted to coil 38 through coil 40 as voltage signal E. The arrangement of coils 38, 40 insures that the signal E has the opposite polarity to the ripple R. As a result, when the signal E is (after phase correction) is superimposed on the signal through coil 28, the ripple R is essentially canceled.

Figure 3:
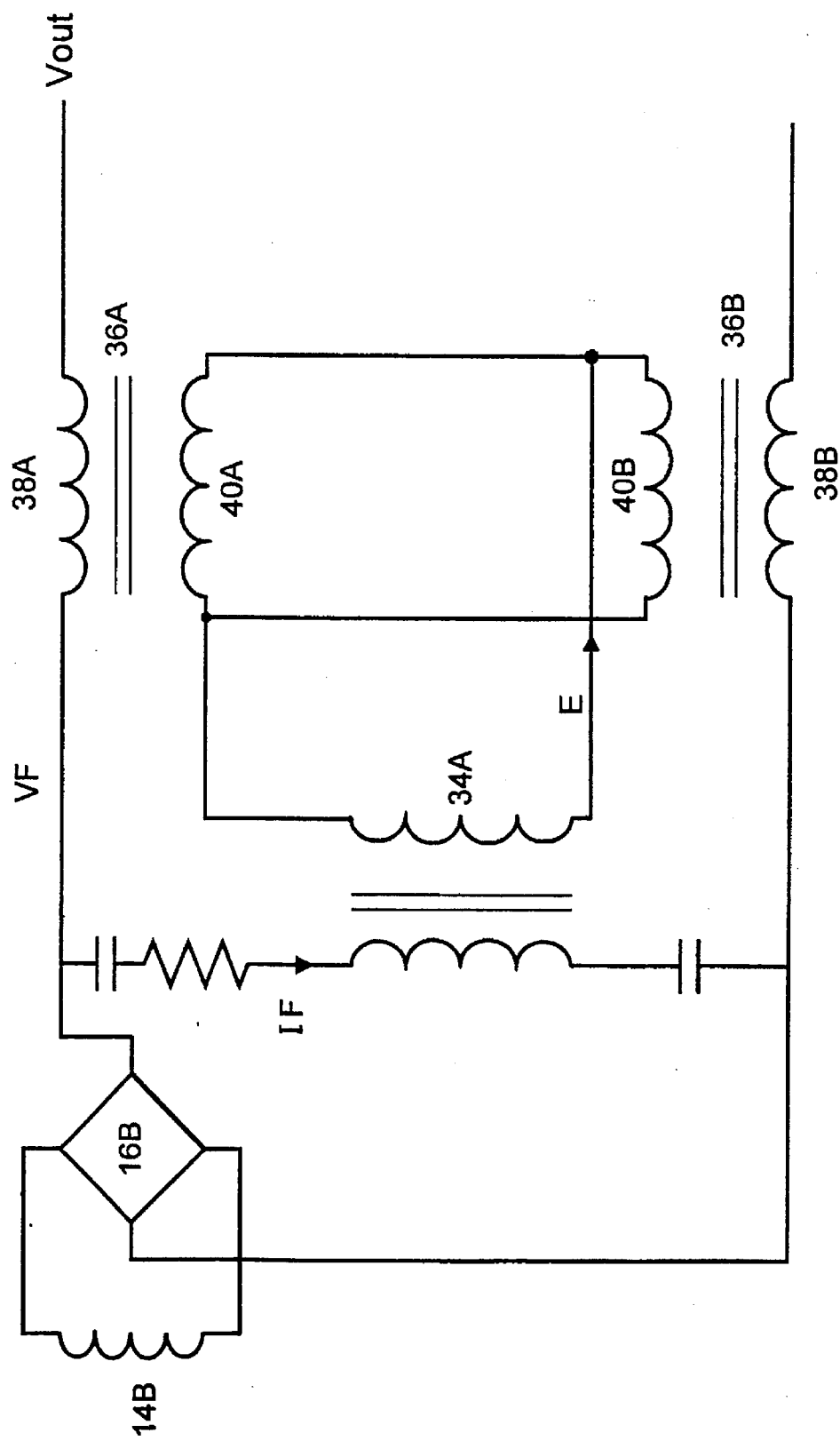
FIG. 3 shows the circuit of FIG. 2 modified for floating output.

Another embodiment of the invention is shown in FIG. 3. In this figure, transformer coil 14C is connected to a rectifier bridge 16C. In this configuration, the output ports 42A, 42B are floating with respect to the AC power source 8, and two current limiting inductors are required. For this purpose, in the present invention, two transformers 36A and 36B are provided. Each of these transformer has a primary coil 38A, 38B used as current limiting inductors. The secondary coils 40A, 40B are connected in parallel with secondary coil 34A of transformer 30A. This embodiment functions in a manner similar to the one in FIG. 2.

The present inventors have found that typical 1 KV power supplies with multiple stage output filters as described above can generate, for example, a nominal output of 1 KV dc with a ripple voltage of 100 mV peak. Using the present invention, a power supply can be provided with a ripple of less than 5 mV.

Although the invention has been described with reference to several particular embodiments, it is to be understood that these embodiments are merely illustrative of the application of the principles of the invention. Accordingly, the embodiments described in particular should be considered exemplary, not limiting, with respect to the following claims.

I claim:

1. A low ripple output DC power supply having a DC output comprising:

input means for receiving an AC input;

rectifying means for generating a rectifier output from said AC input;

filter means for generating a filtered output having a DC component and a ripple component;

ripple sensing means for sensing said ripple component and generating a ripple correcting signal;

phase correction means for generating a phase corrected signal from said ripple correcting signal, whereby said phase corrected signal and said ripple component have opposite phases; and summing means for summing said filtered output and said phase corrected signal to generated said DC output consisting substantially of said DC component, whereby said DC output is substantially free of ripple.

2. The power supply of claim 1 wherein said filter means is represented by an equivalent series capacitor and a series equivalent resistor, said ripple component being generated by said series equivalent resistor.

3. The power supply of claim 2 wherein said ripple detection means includes a first transformer having a first primary coil for sensing current through said equivalent series resistor and a first secondary coil for generating said error correction signal.

4. The power supply of claim 3 comprising a second transformer having a second primary coil receiving said filtered output and a second secondary coil coupled to said first secondary coil.

5. The power supply of claim 4 wherein said first and second transformers are arranged to provide a phase shift of said error correction signal.

6. A DC power supply for generating a DC output with substantially no ripple comprising:

an input receiving AC power from an AC supply;

a transformer transforming said AC power to an output AC power;

a rectifier rectifying said output AC power into DC power;

a filter filtering said DC power to generate a filtered power, said filtered power having a DC component and a ripple component;

an inductor coil for outputting said filtered DC power as output DC power, said inductor coil being provided for current limiting;

a ripple sensor for sensing said ripple component and for generating a corresponding correcting signal; and a coupler for coupling said correcting signal to said inductor coil for substantially eliminating said ripple component from said output DC power.

7. The power supply of claim 6 wherein said inductor means includes a first transformer having a first primary coil for passing transmitting said dc filtered power to an output port and a first secondary coil for receiving said correcting signal and superimposing said correcting signal on said filtered dc power.

8. The power supply of claim 7 wherein said ripple sensing means includes a second transformer having a second primary coil coupled to said filtering means and a second secondary coil coupled to said first secondary coil.

9. A DC power supply for delivering low ripple DC power of a preselected nominal DC amplitude, said power supply comprising:

an input receiving AC power;

a full wave rectifier for generating a full wave rectified output from said AC power;

a filter for filtering said full wave rectified output, said filter including a resistive element, said filter generating a filtered DC output consisting of a DC component and an undesirable ripple caused by said resistive element;

a first current limiting coil receiving said filtered DC output, said inductor providing a current limited DC output; and a ripple eliminator for eliminating said ripple, said ripple eliminator including a sensor coil for sensing said ripple, a generator coil for generating a correcting signal and a first coupling coil for coupling said correcting signal to said first current limiting coil, said first current limiting coil superimposing said correction signal on said filtered DC output for canceling said ripple.

10. The power supply of claim 9 wherein said sensor coil and said generator coil are inductively coupled to form a generator transformer.

11. The power supply of claim 9 wherein said first coupling coil and said first current limiting coil are inductively coupled to form a first tipple correction transformer.

12. The power of supply of claim 9 wherein said generator coil and said first coupling coil are connected to form a series loop.

13. The power supply of claim 9 further comprising a first and a second output line, said first current limiting coil being disposed in series with said first output line, said power supply further comprising a second current limiting coil in series with said second output line.

14. The power supply of claim 13 wherein said ripple eliminator further includes a second coupling coil for coupling said correcting signal to said second current limiting coil.

15. The power supply of claim 13 wherein said sensor coil and said generator coil are inductively coupled to form a generator transformer.

16. The power supply of claim 13 wherein said first coupling coil and said first current limiting coil are inductively coupled to form a first ripple correction transformer and said second coupling coil and said second current limiting coil are inductively coupled to form a second ripple correction transformer.

17. The power of supply of claim 13 wherein said generator coil, said first coupling coil and said second coupling coil are interconnected in a common circuit.

* * * * *